United States Patent
Yi et al.

(10) Patent No.: US 9,924,393 B2
(45) Date of Patent: Mar. 20, 2018

(54) METHOD AND APPARATUS FOR WIRELESS COMMUNICATION

(71) Applicant: LG ELECTRONICS INC., Seoul (KR)

(72) Inventors: Yunjung Yi, Seoul (KR); Hyangsun You, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 64 days.

(21) Appl. No.: 14/912,888

(22) PCT Filed: Oct. 17, 2014

(86) PCT No.: PCT/KR2014/009813
§ 371 (c)(1),
(2) Date: Feb. 18, 2016

(87) PCT Pub. No.: WO2015/057028
PCT Pub. Date: Apr. 23, 2015

(65) Prior Publication Data
US 2016/0205571 A1   Jul. 14, 2016

Related U.S. Application Data

(60) Provisional application No. 61/891,919, filed on Oct. 17, 2013, provisional application No. 61/906,399, filed on Nov. 19, 2013.

(51) Int. Cl.
*H04W 12/04* (2009.01)
*H04W 24/08* (2009.01)
(Continued)

(52) U.S. Cl.
CPC .......... *H04W 24/08* (2013.01); *H04L 1/1812* (2013.01); *H04L 5/0007* (2013.01);
(Continued)

(58) Field of Classification Search
CPC .... H04W 24/08; H04W 16/18; H04L 5/0007; H04L 5/0053; H04L 1/1812; H04L 5/0055; H04L 5/001
See application file for complete search history.

(56) References Cited

U.S. PATENT DOCUMENTS 8,995,376 B2 * 3/2015 Pan .................. H04L 5/001
370/329
9,370,001 B2 * 6/2016 Kim ................. H04W 72/1289
(Continued)

OTHER PUBLICATIONS

Huawei et al., "Consideration on SIB Transmissions for MTC EUs", R1-134052, 3GPP TSG RAN WG1 #74BOS, Oct. 2013, pp. 1-3.
(Continued)

*Primary Examiner* — Phuc Tran
(74) *Attorney, Agent, or Firm* — Lee Hong Degerman Kang & Waimey

(57) ABSTRACT

This application is related to method and apparatus for wireless communication. An example of the method in this application comprises monitoring downlink control channel in a search space, receiving signals on a downlink channel repeating in a unit of a subframe group, based on monitored downlink control channel and transmitting signals on a uplink channel based on the received signal on the downlink channel.

14 Claims, 9 Drawing Sheets

(51) Int. Cl.
*H04L 5/00* (2006.01)
*H04W 16/18* (2009.01)
*H04L 1/18* (2006.01)

(52) U.S. Cl.
CPC .......... *H04L 5/0053* (2013.01); *H04L 5/0055* (2013.01); *H04W 16/18* (2013.01); *H04L 5/001* (2013.01)

(56) References Cited

U.S. PATENT DOCUMENTS

| | | | | |
|---|---|---|---|---|
| 9,525,580 | B2 * | 12/2016 | Kim | ............. H04L 5/0091 |
| 2011/0205978 | A1 * | 8/2011 | Nory | ............. H04L 5/0007 |
| | | | | 370/329 |
| 2011/0274079 | A1 * | 11/2011 | Lee | ............. H04L 5/0007 |
| | | | | 370/329 |
| 2013/0121249 | A1 | 5/2013 | Ji et al. | |
| 2015/0208398 | A1 * | 7/2015 | Pan | ............. H04L 5/001 |
| | | | | 370/329 |

OTHER PUBLICATIONS

LG Electronics, "PBCH Transmission for Coverage Enhancement of MTC EUs", R1-134391, 3GPP TSG RAN WG1 #74IBS, Oct. 2013, pp. 1-6; and fig. 2.

Mediatek Inc., "Discussion on PBCH and System Information Coverage Enhancement", R1-134441, 3GPP TSG RAN WG1 #74BIS, Oct. 2013, pp. 1-4.

Ericsson, "Control Channel Aspects for Enhanced Coverage MTC UE", R1-134651, 3GPP TSG RAN WG1 #74BIS, Oct. 2013, pp. 1-5.

PCT International Application No. PCT/KR2014/009813, International Search Report dated Jan. 16, 2015, 3 pages.

* cited by examiner

METHOD AND APPARATUS FOR WIRELESS COMMUNICATION

CROSS-REFERENCE TO RELATED APPLICATIONS

This application is the National Stage filing under 35 U.S.C. 371 of International Application No. PCT/KR2014/009813, filed on Oct. 17, 2014, which claims the benefit of U.S. Provisional Application No. 61/891,919, filed on Oct. 17, 2013 and 61/906,399, filed on Nov. 19, 2013, the contents of which are all hereby incorporated by reference herein in their entirety.

TECHNICAL FIELD

This application is related to wireless communication, specifically method and apparatus for enhancing the coverage of a User Equipment.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

In next generation of LTE-A, it is considered configuring a system using a low cost and/or low specification (low performance) terminal mainly for a data communication such as reading an electric meter, measuring water level, surveillance, stock management of a vending machine, etc. The terminal may be called as machine type communication (MTC) device (MTC terminal) for a convenience of description.

As for the usage of the MTC device, it is efficient to use a MTC device with a low price and a low battery consumption since an amount of transmitted data may be small and there may occasionally be an uplink/downlink data transmission in a case of a communication using the MTC device.

SUMMARY OF INVENTION

Technical Problem

An object of the present invention is to provide method and apparatus for enhancing coverage for a user equipment.

Another object of the present invention is to provide method and apparatus for using a new structure of subframe.

Another object of the present invention is to provide method and apparatus operated under new structure of subframe.

Technical Solution

An embodiment of the present invention is a method for wireless communication by a user equipment (UE) which comprises monitoring downlink control channel in a search space, receiving signals on a downlink channel repeating in a unit of a subframe group, based on monitored downlink control channel and transmitting signals on a uplink channel based on the received signal on the downlink channel, wherein the subframe group comprises m subframes (m is integer and 0<m).

Another embodiment of the present invention is a apparatus for wireless communication which comprises a radio frequency (RF) unit for transmitting and receiving a radio signal and a processor operatively coupled to the RF unit, wherein the processor is configured for transmitting signals via the RF unit, wherein the processor performs monitoring downlink control channel in a search space and receiving signals on a downlink channel repeating in a unit of a subframe group, based on monitored downlink control channel.

Advantageous Effects

According to the present invention, coverage of a user equipment can be enhanced.

According to the present invention, a user equipment and a base station can be operated under new frame structure in order to enhance a coverage of the UE.

MODE FOR INVENTION

Figure 1:
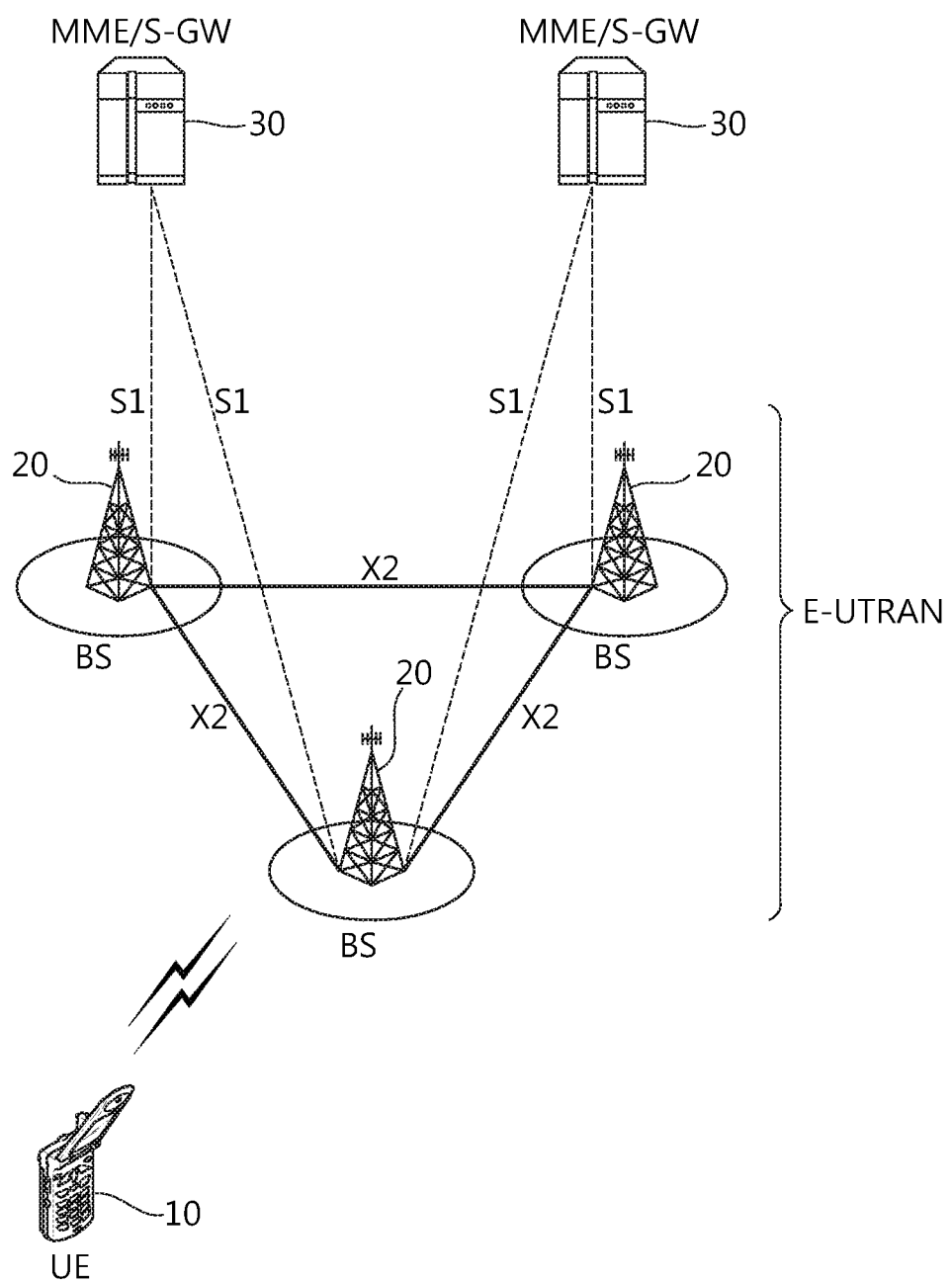
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
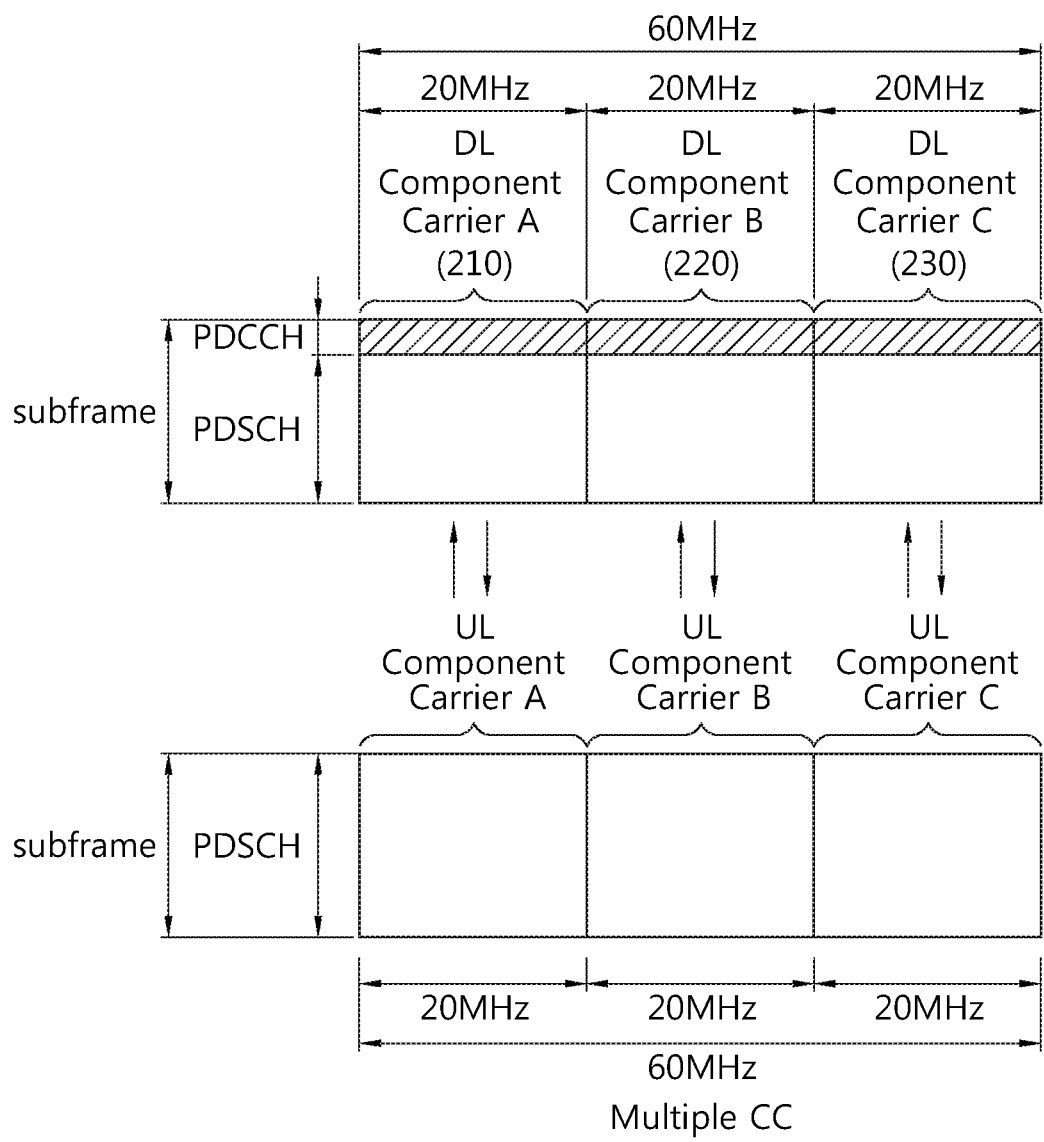
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
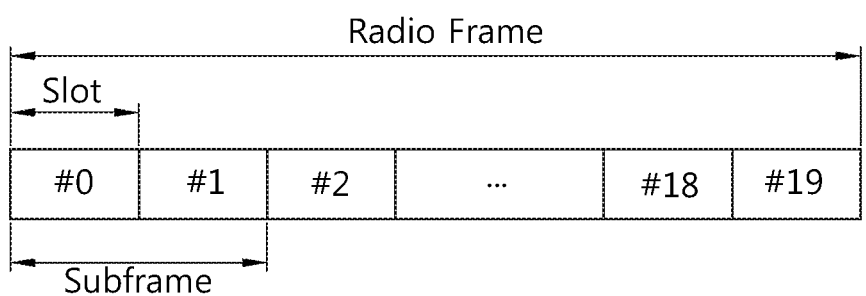
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc.

A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
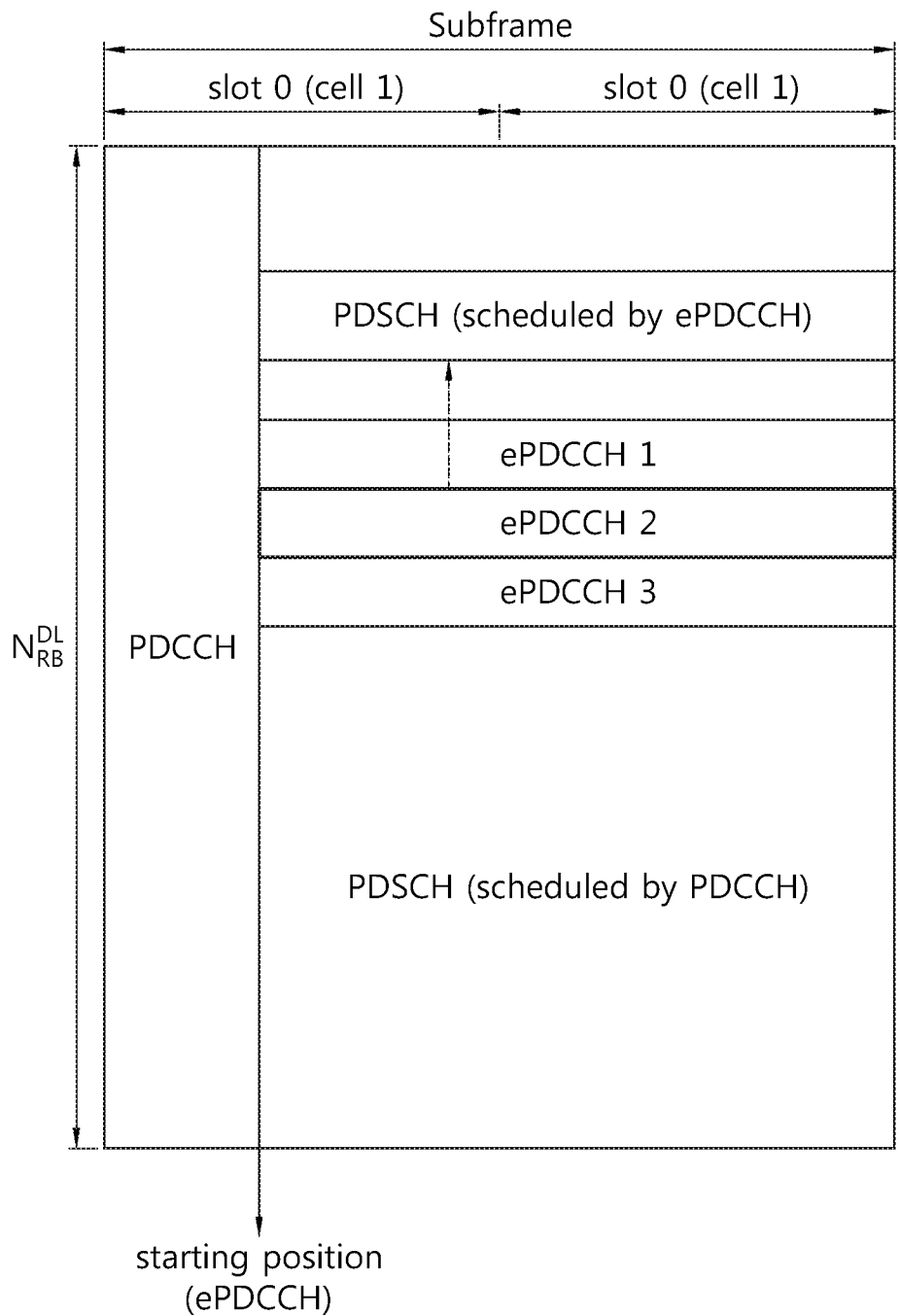
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. While EPDCCH is transmitted in UE specific search space, PDCCH can be transmitted in common search space as well as in UE specific search space. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, in next generation of LTE-A system, it is considered using a terminal (user equipment) with low cost and low performance terminal mainly for a data communication such as reading an electric meter, measuring water level, surveillance, stock management of a vending machine, etc. This type of a terminal may be called as machine type communication (MTC) device (MTC UE). For the usage of the MTC device, it is efficient to maintain a MTC device with a low price and a low battery consumption since an amount of transmitted data may be small and there may occasionally be an uplink/downlink data transmission in a case of a communication using the MTC device.

Furthermore, it is expected that those MTC devices are installed rather coverage-limited area such as basement. To enhance the coverage enhancement while reducing the cost of MTC devices, this invention assumes that the network may handle both normal UEs (Category 1-9 specified in 3GPP TS 36.306 without any additions for coverage enhancement techniques and low cost UE (Category 0 UE or new Category UE without any additions for coverage enhancement techniques)) and coverage limiting UEs which are operated with coverage enhancement techniques applied. To avoid the unnecessary spectral efficiency degradation to handle coverage-limiting UEs, it is essential to best estimate the required coverage enhancement. Also, handling this new type of UEs should not jeopardize the legacy UEs which are not aware of the existence of coverage limiting UEs.

It is expected that repetition techniques would be used for coverage limiting UE where repetition may be applicable to all the channels except for PSS/SSS. Thus, how to define repetition window should be clarified in two or three aspects.

First, it should be specified when to start a repetition. Secondly, the maximum possible repetition should also be specified, otherwise, UE may not be able to complete a decoding on a repetition bundle. Thirdly, optionally, the minimum possible repetition may also be specified such that a UE is assured with a certain number of repetitions in a repetition window. Given that LTE specification specifies HARQ-ACK timing and other timing based on subframe (1 msec) level, repetition may require introducing new HARQ-ACK timing and other timing properties.

This invention provides new subframe structure called as 'subframe group (SFG)' in this application. The subframe group (SFG) can be used as a unit for a coverage limiting UEs in terms of transmitting and receiving control and data channels.

Figure 5:
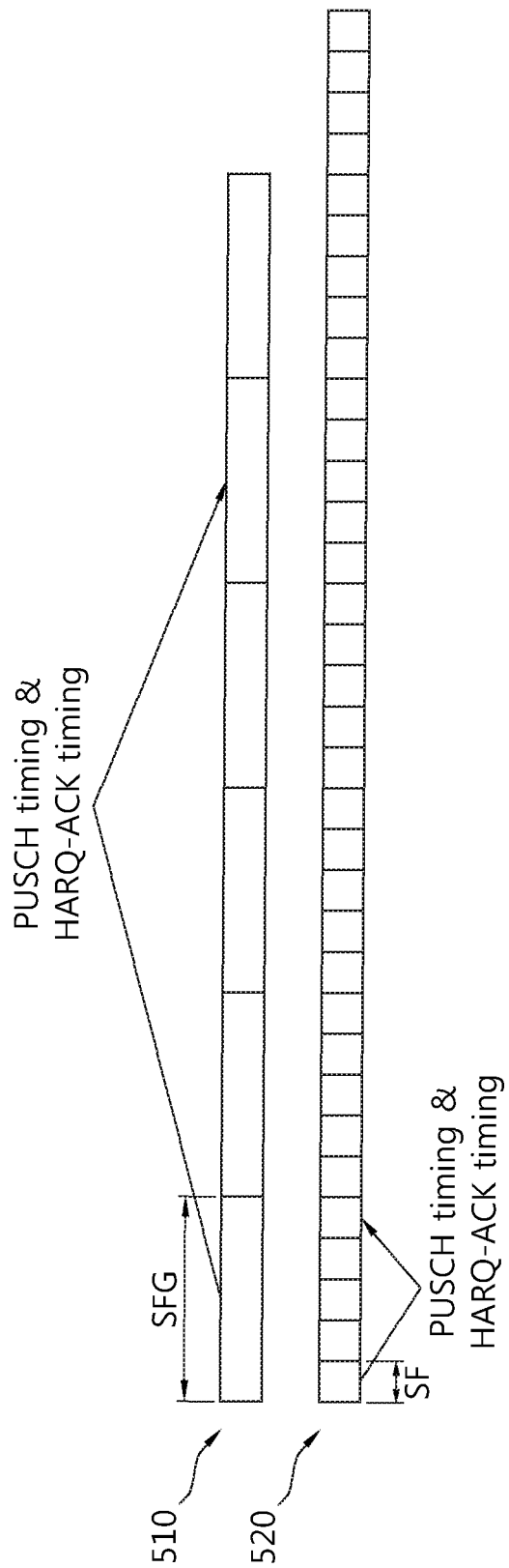
FIG. 5 briefly describes the concept of subframe group (SFG) comparing with a legacy subframe.

FIG. 5 briefly describes the concept of subframe group (SFG) comparing with a legacy subframe.

SFG can consists of "m" subframes where "m" can be any number of integer larger than zero or "m" can be predetermined such that "m" is the largest repetition number to support any control/data channel to satisfy the coverage enhancement requirement.

For example, if the maximum repetition needed for 20 dB enhancement for PUSCH is 1000, m can be fixed as "1000". Or, it can be configurable by eNB which will be conveyed in either PBCH, PSS/SSS, or SIB or higher-layer signaling or DCI or by a new physical layer signal or via random access response. It is noted that 'm' can be configured per UE or can be a cell-specific parameter.

If it is configured per cell-specific, 'm' can be determined based on the maximum coverage enhancement level that the network supports. If 'm' is determined per UE, it can be determined based on the coverage enhancement level that UE requires. Moreover, a UE may send the intended size of 'm' to the network based on its measurement and coverage enhancement level required via for example higher layer signaling such as RRC signaling or Msg3 in RACH procedure.

In the example of FIG. 5, comparing SFGs 510 with legacy subframes 520, SFG consists of 5 subframes. However, "m" is not constrained as 5.

Actually, to handle MBSFN subframes and other paging for legacy UEs, it is desirable to define "m" as multiple of 10 where MBSFN subframes or a subset of subframes may not be used for SFG. In other words, if two subframes per radio frame are MBSFN subframes and used for MBMS services, only the remaining subframes would be used for SFG and used for repetition.

A bitmap to indicate a set of valid subframes within a SFG can be also considered.

Furthermore, it can be also considered that if a subset of subframes are predetermined for the potential starting subframes for either control channel starting subframes for repeated control channel or data channel, 'm' can be number of those subframes. In that case, the size of SFG of 'm' is the number of subframes between the starting of such a subframe set to 'm'-th subframe of such a subframe set. For example, if every first subframe every 8 subframes can be used of the starting subframe for control/data channel repetition, if 'm'=3, the SFG size is 24 subframes from starting to the end of such a subframe sets.

It is also feasible to configure 'm' per each repetition level. For example, if three repetition levels are determined e.g., 10, 20, and 50 repetitions, three 'm' values can be configured e.g., m=20 for 10 repetitions, m=40 for 20 repetitions, m=100 for 50 repetitions respectively.

If this is applied, a system has multiple levels of SFG definitions where each SFG applies to each repetition level. For common-search-space, only one repetition level may be assumed which may be the maximum repetition level.

In general, different starting subframe sets can be configured per each repetition level. For example, starting subframe set for (E)PDCCH for repetition=10 can be defined as first subframe of subframe number (SFN) % 2=0 and starting subframe set for (E)PDCCH for repetition=20 can be defined as first subframe of SFN %4=0 and starting subframe set for (E)PDCCH for repetition=50 can be defined as first subframe of SFN %10=0.

The HARQ-ACK timing and other scheduling timing can be preserved similar to legacy UE expect that the unit where timing applies changes to SFG instead of SF (subframe). The example of FIG. 5 shows the HARQ-ACK timing is preserved for SFG same as legacy subframe case. In the case of FIG. 5, the HARQ-ACK/NACK for SFG is transmitted for the signal received four SGFs before in case that the HARQ-ACK/NACK for legacy subframe is transmitted for the signal received four subframes before.

The overall latency would be increased with "m" times, and thus, as m increases, the overall latency of coverage limiting UE may increase.

Based on this new SFG structure, this invention discusses how coverage-limiting UEs are operating as below.

(1) Primary Synchronization Signal (PSS)/Secondary Synchronization Signal (SSS)

For random access, UE needs to synchronize downlink timing. With primary synchronization signal (PSS)/secondary synchronization signal (SSS), the UE may synchronize downlink timing and The UE may derive physical cell ID.

A UE can perform PSS/SSS detection in two different ways to determine whether it needs coverage enhancement and potentially whether eNB supports coverage enhancement or not.

A UE attempts to discover a cell based on PSS/SSS based on SF (SF#0/SF#5 transmits PSS/SSS) and PSS/SSS based on SFG (SFG#0/SFG#5 transmits PSS/SSS—note that actual SFG index to transmit PSS/SSS can be changed). For a SFG transmits PSS/SSS, a few design choices are possible such as (A) and (B) as below.

(A) Transmitting PSS/SSS aligned with SF#0/SF#5 every #5 msec—This approach may not allow UE to determine whether eNB supports coverage enhancement or not.

(B) A burst PSS/SSS or PSS/SSS repetition may be transmitted in SFG transmitting PSS/SSS—This approach may allow UE to determine whether eNB supports coverage enhancement or not. Different scrambling of PSS/SSS from legacy PSS/SSS can be also considered.

If approach B is used, a UE may not need a new requirement on PSS/SSS acquisition. In terms of measuring SNIR of received PSS and/or SSS, accumulated/aggregated SNIR among multiple PSS/SSS transmission in the same SFG can be used.

For example, if SFG consists of '14' subframes, each subframe can be treated as if one OFDM symbol in normal CP (12 subframes for extended CP case).

Then, the mapping of PSS/SSS can follow the legacy pattern where the repeated PSS and/or SSS can be performed in subframes mapping to PSS and/or SSS mapping location. For example, following FDD, OFDM symbol 5 and 6 are used for SSS and PSS respectively.

Thus, the repeated (14 repeated SSS) can be placed in the $6^{th}$ subframe in a SFG (the first and/or $6^{th}$ SFG in a radio frame group) and the repeated (14 repeated PSS) can be placed in the $7^{th}$ subframe in a SFG. In this case, mapping of each reference signal such as CRS can be also repeated over all OFDM symbols in a subframe mapping whose index in a SFG maps to the OFDM symbol index in a RB. Mapping is same as current design with the repeated transmission over the entire OFDM symbols in a subframe.

(2) Reference Signal Received Power (RSRP) Measurement

Before a UE determines whether the eNB supports coverage enhancement or not or it supports SFG or not, the default behavior of UE on RSRP measurement should be based on SF rather than SFG. However, once it determines eNB supports SFG or not, this information can be used to perform Radio Resource Management (RRM) measurement. If CRS for example is repeated over one subframe, RSRP can be performed also based on SFG instead of subframe.

For example, instead of averaging RSRP (average power per RE for RS) over 1 SF, average power over summed power over subframes in SFG can be used instead. Or, only SF#0/SF#5 may be assumed as for summation of RS power. This RSRP makes sense only when a UE accumulate repeated RSs transmitted over subframes within one SFG.

To consider MBSFN subframe and other potential issues, subframe not used or not configurable for MBSFN subframes can be assumed for RSRP measurement if this approach is used.

(3) Physical Broadcast Channel (PBCH) Transmission

In terms of PBCH design, two approaches (a) and (b) can be also considered.

(A) New PBCH to carry SFGN instead of SFN: One approach is to introduce new PBCH so that it will be transmitted to deliver SFGN (SFG Number) rather than SFN (SF Number). For example, new PBCH can be transmitted in SFGN#0 in every RFG (Radio Frame Group—where one RadioFrameGroup consist of 10 SFGs). In SFGN#0, repetition will be occurred to address coverage limiting UEs. By introducing new PBCH, the content can be reduced so that the required PBCH repetition can be reduced and also to convey SFGN and thus allow UE to decode PBCH over 4 RFGs or x RFGs (x is a integer, 0<x).

(B) Exploit legacy PBCH: Another approach is to reuse legacy PBCH such that repetition would occur intermittently or continuously. A UE will detect PBCH based on SF structure rather than SFG.

(4) System Information Block (SIB) Transmission

SIB window can be determined based on SFG rather than SF. For example, if SIB window of SIB1 is 80 msec where subframe #5/#25/#45/#65 transmits SIB1 without changing the content, SIB window for SIB1 for CE would be 80*m msec where SFG #5/#25/#45/#65 transmits SIB. A new design of SIB can be also considered. For example, rather infrequent transmission of SIB repeated over a SFG can be also considered.

In each SFG, detailed mechanism of data transmission is described as below. To support this, if (3) (B) above i.e. exploiting legacy PBCH is used for PBCH (legacy PBCH repetition) where a UE may not be able to determine whether the network supports SFG or not, a signaling or indication may be necessary either in PBCH or by other means. If PBCH carries the information, reserved bits may be used or new MIB may be considered for PBCH repetition which includes such information. In terms of repeating SIB transmissions within SFG where SIB transmission is expected, a few alternative approaches can be considered.

(A) PDCCH-less PDSCH repetition: One approach is to transmit SIB without scheduling DCI using a prefixed resource locations in terms of time and frequency. For example, every #5 and #25 SFG transmit SIB PDSCH in center 2 physical resource blocks (PRBs). Modulation and other necessary information to decode PDSCH repetition should be predetermined or signalled by PBCH or other signals.

(B) PDCCH scheduling PDSCH: In this case, repetition of PDCCH comes in one SFG where the bundled/scheduled repeated PDSCHs comes in the next SFG as shown in below.

In both cases, SIB transmission within a SFG may be occurred only at subframes where legacy SIB transmission is scheduled. For example, SIB1 can be transmitted subframe #5/#25 following subframe structure. In a SFG, only those subframes may carry SIB data. In terms of system information (SI) window, however, can be determined based on SFG. In other words, SI window for SIB1 can be "160*m" msec such that SIB1 will be kept the same within 160*m msec window.

Note that control region referred in this application can indicate a control region allocated for a MTC UE which accesses a network supporting a reduced bandwidth. For example, if a MTC UE supports only 1.4 Mhz RF/baseband bandwidth in both downlink and uplink, a control region for such a UE can be defined in resource location except for a few OFDM symbols in each subframe which will be used for non-MTC UEs or legacy UEs. For example, first 3 OFDM symbols in each subframe are reserved for legacy UEs, and a control region of MTC UE can start from 4-th OFDM symbol in each subframe.

If the control region of MTC is 3 OFDM symbols, 4-th, $5^{th}$, $6^{th}$ OFDM symbols can be used for control region for MTC UEs. If EPDCCH type resource mapping is used, control channel for a MTC UE can span the entire OFDM symbol except for control region used for legacy and/or non-MTC UEs.

(5) PDCCH and PDSCH Transmission

Repetition occurs for PDCCH and/or PDSCH within a SFG where the repetition starts at the first subframe of each SFG and may end before or at the end of subframe of each SFG. PDSCH can be cross-SFG scheduled such that n-th SFG schedules PDSCH transmission in n+1-th SFG.

Figure 6:
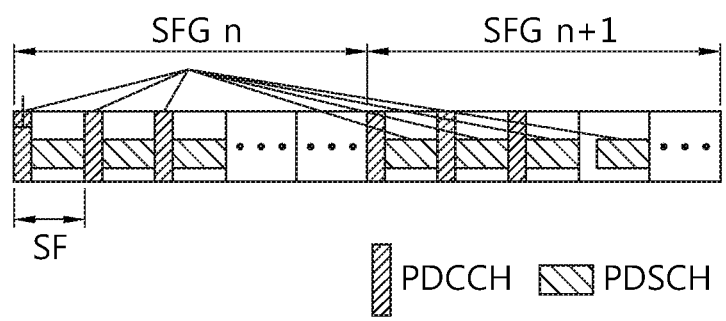
FIG. 6 briefly illustrates an example of cross-SFG scheduling.

FIG. 6 briefly illustrates an example of cross-SFG scheduling.

Referring to FIG. 6, the control data in n-th SFG is signaled to schedule PDSCH in n+1-th SFG. Or, a gap (e.g., k SFGs) can be also considered considering there could be some ACK-NACK for control data as well.

Repeating PDCCH over multiple SFs within SFG can have multiple approaches as follows (a) and (b).

(a) Repetition across subframe: Keeping the same format and procedure to legacy PDCCH and repeat PDCCH over SFs within a SFG (b) One DCI/PDCCH across subframes within a SFG: A control region of SFG can consists of m+1 to m+k OFDM symbols, inclusively, (k is integer, 0<k) in each subframe within a SFG or a few PRBs in each subframe. If PRBs are used for control channel such as EPDCCH like resource mapping, a few OFDM symbols in each subframe may be excluded to accommodate legacy PDCCH. A control region of each serving cell consists of a set of Group CCEs (G-CCEs) numbered from 0 to $N_{G-CCE,k}$-1 (where details of G-CCEs placement is shown in below) where $N_{G-CCE,k}$ is the total number of G-CCEs in the control region of SFG k. The CE in which UE will monitor a set of PDCCH candidates (which will be described in below as well) on the activated serving cell(s) in every non-discontinuous reception (non-DRX) SFGs or SFGs configured to monitor PDCCHs.

With the SFG, group CCE can be introduced as described above. The more details on G-CCE is provided as below.

G-CCE: There could be multiple approaches such as Alt 1 to Alt 3 to determine G-CCE as well.

(Alt1) Based on grouping of CCE or E-CCE: A simple approach is to group a set of CCEs or E-CCEs across subframes within a SFG. For example, a G-CCE can consist of "m" CCEs or E-CCEs where one CCE is selected from each subframe within a SFG. How to select one CCE from each subframe can have the following options option1 and option2.

Option1: Use pre-determined pattern, such as CCE(j % $N_{CCE,k}$, j % $N_{CCE,k}$) from each subframe can be grouped as one G-$CCE_{j,k}$ where $N_{CCE,k}$ is the number of (E)CCEs per subframe within a SFG k assuming the number is constant within a SFG. Or other patterns can be used.

Option2: Group CCEs with same index calculated based on both SFN and CCE index. For example, G-CCEj can be a group of $CCE_{i,1}$ where f(i, 1)=j where i is SFN and 1 is CCE index.

(Alt2) Map CCE or E-CCE over multiple subframes within a SFG. That is, one CCE can be assumed as "m" REG or "m" E-REGs over subframes within a SFG where each REG is selected from each subframe within SFG. Similar to Alt1, using predetermined pattern or a function of subframe index and REG index can be considered as alternative approaches.

(Alt3) Map REG or E-REG over multiple subframes within a SFG. That is, in this option, "m" REs in the same location in each subframe within a SFG can be assumed as a REG or E-REG (or following a pattern). G-CCE may be determined as 4 REGs or 4 E-REGs. Similar to Alt1, using predetermined pattern or a function of subframe index and RE index can be considered as alternative approaches.

The concepts of SFG can also affects on (E)PDCCH. Here, (E)PDCCH candidates are described in detail.

(E)PDCCH candidates: The set of PDCCH candidates to monitor are defined in terms of search spaces, where a search space $S_k^{(L)}$ at aggregation level L $\epsilon\{1, 2, 4, 8\}$ is defined by a set of PDCCH candidates. For each serving cell on which PDCCH is monitored, the CCEs corresponding to PDCCH candidate m of the search space $S_k^{(L)}$ are given by $L\{(Y_k+m')\mod\lfloor N_{G\text{-}CCE,k}/L\rfloor\}+i$.

Here, $Y_k$ is defined below, i=0, . . . , L−1. For the common search space, m'=m.

For the UE specific search space, for the serving cell on which PDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, . . . , $M^{(L)}$−1. $M^{(L)}$ is the number of PDCCH candidates to monitor in the given search space.

Table 1 shows PDCCH candidates monitored by a UE.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The EPDCCH candidates monitored by a UE also can be derived in a way as 3GPP TS 36.213. Table 2 shows an example of EPDCCH candidates monitored by a UE.

TABLE 2

| | Number of EPDCCH candidates $M_p^{(L)}$ for Case 1 | | | | | Number of EPDCCH candidates $M_p^{(L)}$ for Case 2 | | | | |
|---|---|---|---|---|---|---|---|---|---|---|
| $N_{RB}^{X_p}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

For the common search spaces, $Y_k$ is set to 0 for the two aggregation levels L=4 and L=8.

For the UE-specific search space $S_k^{(L)}$ at aggregation level L, the variable $Y_k$ is defined as MATH 1.

$$Y_k = (A \cdot Y_{k-1}) \mod D \qquad \text{<MATH 1>}$$

where $Y_{-1}=n_{RNTI}\neq 0$, A=39827, D=65537 and k=$\lfloor n_s/2 \rfloor$, $n_s$ is the 2*SFG index within a RFG (radio frame group). The RNTI value used for $n_{RNTI}$ is defined in 3GPP TS 36.213 section 7.1 in downlink and 3GPP TS 36.213 section 8 in uplink.

The concepts of SFG can affects on PDSCH also. Here, PDSCH repetition is described in detail.

PDSCH repetition: A number of repetition can be determined by eNB depending on channel conditions and other information. However, the number will vary between 1 to m (m is integer and 0<m). Thus, a UE may attempt to decode PDSCH in every subframe during SFG. However, the repetition of PDSCH starts only at the first subframe of each SFG.

(6) CRS Transmission

A UE may assume that CRS will be transmitted over entire OFDM symbols or the downlink part of the special subframe (DwPTS) in subframe which cannot be configured as MBSFN subframe (i.e., #0/#4/#5/#9 in FDD, #0/#1/#5/#6 in TDD). In other subframes, it shall assume that at least one or two (depending on the number of antenna ports) OFDM symbols carry CRS, and it shall not assume any other OFDM symbols may carry CRS or not. If additional CRS will be used for the UE, it can be signaled to the UE so that it can use the information.

(7) Multimedia Broadcast/Multicast Service (MBMS) Support

Two aspects need to be considered for MBMS services. One aspect is to handle legacy UE's MBMS reception and the other is to handle coverage limiting UEs' MBMS services. First, to support legacy UE's MBMS reception, a few alternatives such as (i)~(iv) are feasible:

(i) if there is MBMS services transmitted in a SFG, either PDCCH or PDSCH for coverage enhancement UE will not be transmitted so that MBMS services for legacy UEs can be successfully transmitted. Thus, legacy UE MBMS and data/control transmission to coverage enhancement UE will not be multiplexed.

(ii) Another option is to pre-configure or configure coverage enhancement UEs not to use "MBMS-transmitting" subframes for their repetitions so that repetition within a SFG will be occurred only in subframes which are not used for MBMS services.

(iii) Another option is that either coverage enhancement UE reads all MBSFN-area configuration and MSMS configurations so that it may skip those subframes in the decoding or eNB may inform the set of subframes used for MBMS which will be skipped for data decoding as well.

(iv) Aggregation of PDCCHs between normal subframe and MBSFN subframe can be performed where some restrictions may apply. For example, if aggregation among repetition of PDCCH across multiple subframes is based on "resource location" i.e., the same RE or REs following a pattern will be aggregated, only one or two (depending on the number of antenna ports) will be assumed that aggregation can be accomplished.

(8) PUSCH Transmission

In terms of PUSCH transmission, even with SFG definition, the required number of repetition may exceed one SFG. To handle this case, the number of repetition can be configured or signalled by DCI. For example, if 3 times of repetition is configured, a UE transmits PUSCH over three SFGs.

(9) Physical Random Access Channel (PRACH) Transmission

In terms of PRACH configuration, a UE should interpret PRACH configuration given by SIB2 or a new SIB based on SFG rather than SF. SIB2 includes information needs for a UE to access the cell. For example, SIG2 includes information on the uplink cell bandwidth, random-access parameters, and parameters related to uplink power control, etc. One or more SFGs can be used to transmit PRACH.

(10) TDD DL/UL Configuration Handling

To handle TDD DL/UL configuration, two options ① and ② can be considered

① If a SFG is not scheduled for uplink transmission, it can be assumed as downlink and a coverage-enhancement UE expects to receive downlink data. There are two alternatives in this case.

alt1: A UE expects to receive downlink data only when downlink subframe or DwPTS.

alt2: A UE expects to receive downlink data regardless of subframe type.

If a SFG is scheduled for uplink transmission, it can be assumed as uplink and a coverage enhancement UE expects to transmit. There is also two alternatives in this case.

alt1: A UE transmits data only when uplink subframes.

alt2: A UE transmits data regardless of subframe type.

② TDD DL/UL configuration is applied to SFG level. In other words, a TDD DL/UL configuration maps to each SFG. Within a SFG configured for DL, there are two alternatives.

alt1: A UE expects to receive downlink data only when downlink subframe or DwPTS.

alt2: A UE expects to receive downlink data regardless of subframe type.

Within a SFG configured for UL, there are also two alternatives.

alt1: A UE transmits data only when uplink subframes.

alt2: A UE transmits data regardless of subframe type.

In this) TDD DL/UL configuration handling, guard period and uplink part of the special subframe (UpPTS) in special subframe may not be assumed. In other words, special subframe can consist of all downlink subframes (except for the last subframe which will be used to switching).

(11) Paging

Paging for coverage enhancement UE will be occurred in paging SFGs configured for paging.

Note that in terms of UE initially accessing a cell, a UE may search a cell with legacy frame structure. If a UE cannot identify the cell or determines it needs coverage enhancement, it may search PSS/SSS based on subframe group frame structure. If the network supports coverage enhancements, a UE is able to search the cell based on SFG frame structure. Afterwards, the process is same as the normal LTE specification except that the TTI duration becomes longer=the duration of a SFG.

Figure 7:
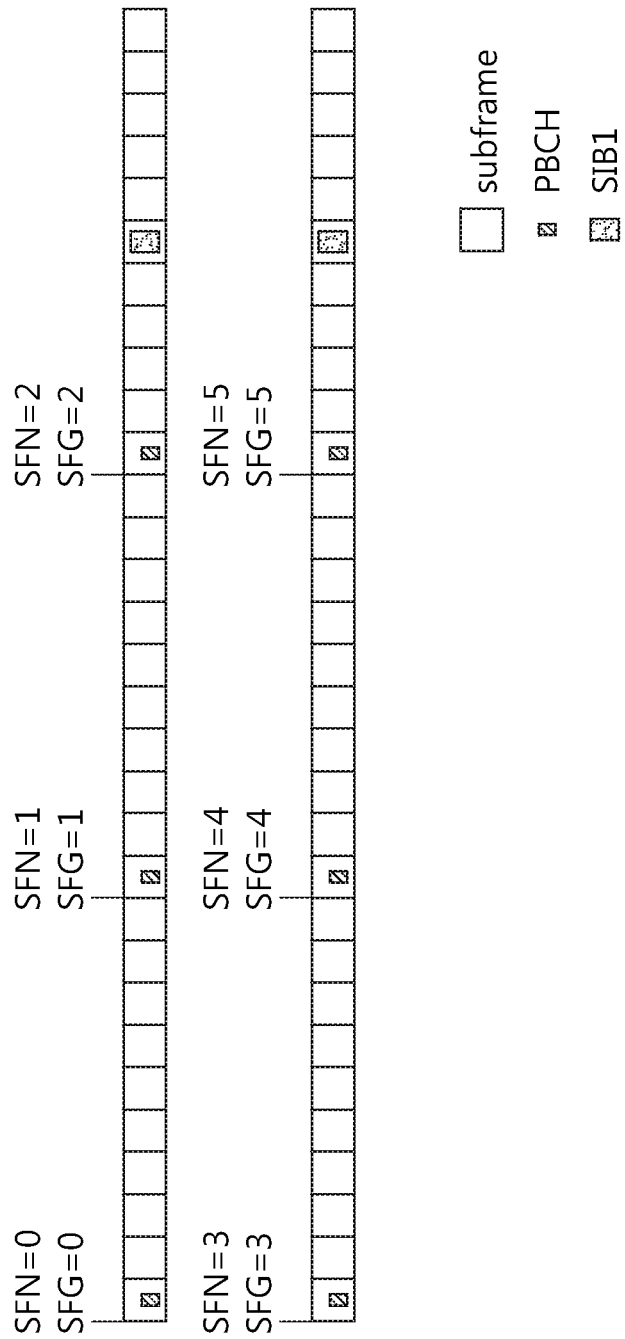
FIG. 7 shows an example of PBCH and SIB transmission briefly when SFG is applied.

FIG. 7 shows an example of PBCH and SIB transmission briefly when SFG is applied. In the example of FIG. 7, SFG comprises 10 subframes.

Figure 8:
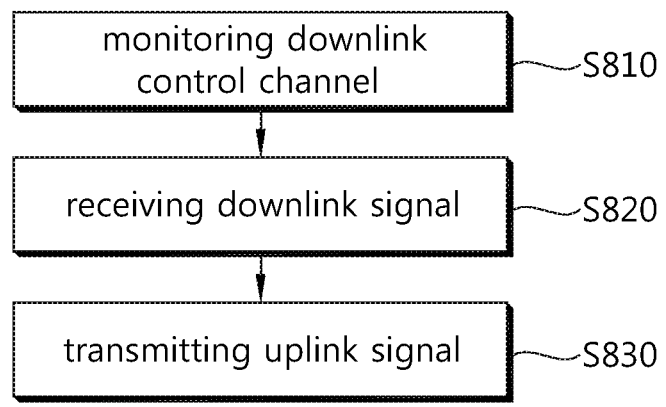
FIG. 8 is a flow chart briefly describing an operation of a UE according to this invention.

FIG. 8 is a flow chart briefly describing an operation of a UE according to this invention.

Referring to FIG. 8, the UE may monitors control channel in the search space under SFG structure at step S810. The control channel candidates (for example, PDCCH/EPDCCH candidates) to be monitored by the UE were described in detail as above.

The UE may receive signals on downlink channel at step S820. The UE may receive signals using data transmitted on the detected control channel under SFG structure. The received signal and process on the signal were described in detail as above.

The UE may transmit signals on uplink channel at step S830. The UE may transmit signals on the uplink channel based on the control data received via the downlink control channel and frame structure such as SFG. As to the SFG and signals using SFG, detailed descriptions were provided above.

Figure 9:
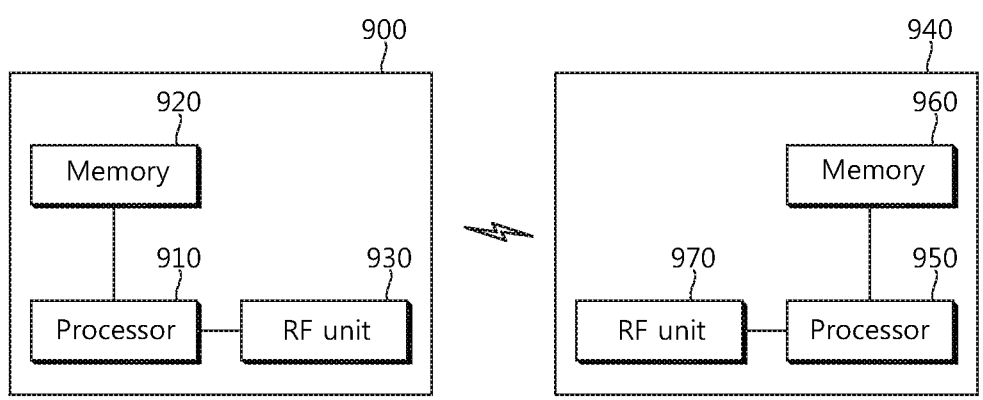
FIG. 9 is a block diagram briefly describing a wireless communication system according to this invention.

FIG. 9 is a block diagram briefly describing a wireless communication system including an UE 900 and a BS (eNB) 940. The UE 900 and the BS 940 may operate based on the description as explained above.

In view of downlink, a transmitter may be a part of the BS 940 and a receiver may be a part of the UE 900. In view of uplink, a transmitter may be a part of the UE 900 and a receiver may be a part of the BS 940.

Referring to FIG. 9, the UE 900 may include a processor 910, a memory 920 and a radio frequency (RF) unit 930.

The processor 910 may be configured to implement proposed procedures and/or methods described in this application. For example, the processor 910 may monitor control channel through search space under SFG structure and/or detect PSS/SSS. The processor 910 may receive and transmit signals using SFG structure as described above. In addition, the processor 910 may also perform process on the received signal or with the received signal under SFG structure such as RSRP measurement. Other details such as G-CCE, etc, are already described before in this application.

The memory 920 is coupled with the processor 910 and stores a variety of information to operate the processor 910, which includes data information and/or control information. The RF unit 930 is also coupled with the processor 910. The RF unit 930 may transmit and/or receive a radio signal.

The BS 940 may include a processor 950, a memory 960 and a RF unit 970. Here, the BS may be PCell or SCell and the BS may be a macro cell or small cell. In addition the BS may be a source cell for network synchronization or a target cell for network synchronization.

The processor 950 may be configured to implement proposed procedures and/or methods described in this application. For example, the processor 950 may determine whether use SFG in order to enhance the coverage of the UE or not. The processor 950 may transmit control channel such as PDCCH/EPDCCH, system information, data channel such as PDSCH repeatedly using SFG structure via RF unit 970. The processor may perform cross SFG scheduling when SFG is determined to be used. Other details such as G-CCE, etc, are already described before in this application.

The memory 960 is coupled with the processor 950 and stores a variety of information to operate the processor 950, which includes data information and/or control information. The RF unit 970 is also coupled with the processor 950. The RF unit 970 may transmit and/or receive a radio signal. The signals transmitted or received via the RF unit 970 are also described before.

The UE 900 and/or the BS 940 may have single antenna or multiple antennas. The wireless communication system may be called as MIMO system when at least one of the UE 900 and the BS 940 has multiple antennas.

The proposed ideas in this invention can be applied to multiple 'm' values (m is integer and 0<m) if the system supports multiple levels of repetition levels or can be applied to the case where a set of starting subframes can be configured for each repetition level for PDCCH and/or PDSCH.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps.

Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or

What is claimed is:

1. A method of wireless communication by a user equipment (UE), the method comprising:
monitoring a downlink control channel in a search space;
receiving signals on a downlink channel repeating in a unit of a subframe group, based on the monitored downlink control channel; and
transmitting signals on an uplink channel based on the received signals on the downlink channel,
wherein the subframe group comprises m subframes (m is an integer and 0<m),
wherein the number of m is determined based on a repetition number or coverage enhancement level supported by a network for the downlink control channel or a data channel.

2. The method of claim 1, wherein the transmitting signals includes transmitting an Acknowledgement/Negative Acknowledgement (ACK/NACK) signal once in the subframe group for a signal transmitted on the downlink channel at a corresponding subframe group.

3. The method of claim 2, wherein the ACK/NACK signal transmitted at an N-th subframe group is for a downlink signal at an N-L-th subframe group when an ACK/NACK signal is transmitted at an N-th subframe for a downlink signal at the N-L-th subframe when the repeating in the unit of the subframe group is not applied.

4. The method of claim 1, wherein the repetition of the signals on the downlink channel begins at a first subframe in the subframe group and ends before or at a last subframe in the subframe group, if 'm' covers a maximum number of repetitions.

5. The method of claim 1, wherein a control region of the subframe group comprises m+1 to m+k Orthogonal Frequency-Division Multiplexing (OFDM) symbols, inclusively, (k is an integer and 0<k) in each subframe in the subframe group where m is the number of OFDM symbols used for the downlink control channel for a non-machine type communication (MTC) UEs or legacy long term evolution (LTE) UEs.

6. The method of claim 5, wherein the control region of the subframe group for each serving cell comprises a set of $N_k$ group control channel elements (G-CCEs), and
wherein the $N_k$ is the number of G-CCEs in the control region consisting of first k OFDM symbols.

7. The method of claim 1, wherein a control region of the subframe group includes group control channel elements (G-CCEs), and
wherein the G-CCE comprises m CCEs or m enhanced CCEs (eCCEs) where one CCE or one eCCE is selected from each subframe in the subframe group.

8. The method of claim 1, wherein a control region of the subframe group includes group control channel elements (G-CCEs), and
wherein the G-CCEs comprise CCEs or eCCEs consisting of resource element groups (REGs) or enhanced REGs (E-REGs) over multiple subframes within the subframe group.

9. The method of claim 1, wherein a control region of the subframe group includes group control channel elements (G-CCEs), and
wherein the G-CCEs comprise resource element groups (REGs) or enhanced REGs (E-REGs) consisting of resource elements (REs), and
wherein the REs are located in a same location in each subframe within the subframe group.

10. The method of claim 1, wherein in the monitoring the downlink control channel, the search space is defined based on which subframe group the downlink control channel is transmitted.

11. The method of claim 1, wherein the UE is a coverage enhanced UE by repetition of downlink signals.

12. The method of claim 1, wherein detection of a synchronization signal is performed with the received signals at predetermined subframe groups as well as at predetermined subframes.

13. The method of claim 1, wherein the received signals include a system information block (SIB) which carries system information needed for communication, and
wherein the system information carried via the SIB is maintained in a unit of the subframe group.

14. A user equipment (UE) for wireless communication, the UE comprising:
a radio frequency (RF) unit for transmitting and receiving a radio signal; and
a processor operatively coupled to the RF unit,
wherein the processor is configured for transmitting signals via the RF unit,
wherein the processor performs monitoring a downlink control channel in a search space and receiving signals on a downlink channel repeating in a unit of a subframe group, based on the monitored downlink control channel,
wherein the subframe group comprises m subframes (m is an integer and 0<m),
wherein the number of m is determined based on a repetition number or coverage enhancement level supported by a network for the downlink control channel or a data channel.

* * * * *